United States Patent [19]
Samuelson et al.

[11] Patent Number: 6,018,018
[45] Date of Patent: Jan. 25, 2000

[54] ENZYMATIC TEMPLATE POLYMERIZATION

[75] Inventors: Lynne A. Samuelson, Marlboro; K. Shridhara Alva, Lowell; Jayant Kumar, Westford; Sukant K. Tripathy, Acton, all of Mass.

[73] Assignee: University of Massachusetts Lowell, Lowell, Mass.

[21] Appl. No.: 08/999,542

[22] Filed: Nov. 21, 1997

Related U.S. Application Data

[63] Continuation-in-part of application No. 08/915,827, Aug. 21, 1997.

[51] Int. Cl.$^7$ .................................................. C08G 73/00
[52] U.S. Cl. ........................ 528/422; 528/487; 528/491; 528/499
[58] Field of Search .................................... 528/422, 487, 528/491, 499

[56] References Cited

U.S. PATENT DOCUMENTS

| | | | |
|---|---|---|---|
| 5,143,828 | 9/1992 | Akkara et al. | 435/41 |
| 5,253,100 | 10/1993 | Yang et al. | 359/266 |
| 5,370,825 | 12/1994 | Angelopoulos et al. | 252/500 |
| 5,420,237 | 5/1995 | Zemel et al. | 528/422 |
| 5,489,400 | 2/1996 | Liu et al. | 252/500 |

OTHER PUBLICATIONS

Tzou, K. and Gregory, R.V., "A method to prepare soluble polyaniline salt solutions—in situ doping of PANI base with organic dopants in polar solvents," *Synthetic Metals*, 53:365–377 (1993).

Nguyen, M.T., et al., "Synthesis and properties of novel water–soluble conducting polyaniline copolymers," *Macromolecules*, 27:3625–3631 (1994).

Shannon, K. and Fernandez, J.E., "Preparation and properties of water–soluble, poly(styrenesulfonic acid)–doped polyaniline," *J. Chem. Soc., Chem. Commun.*, 643–644 (1994).

Tanaka, K., et al., "Doping effect of $C_{60}$ on soluble polyaniline," *Synthetic Metals*, 66:193–196 (1994).

Ferreira, M., et al., "Molecular self–assembly of conjugated polyions: a new process for fabricating multilayer thin fim heterostructures," *Thin Solid Films*, 244:806–809 (1994).

Ng. S.C., et al., "Poly(o–aminobenzylphosphonic acid): a novel water soluble, self–doped functionalized polyaniline," *J. Chem. Soc., Chem. Commun.*, 1327–1328 (1995).

Chen, S. and Hwang, G., "Synthesis of water–soluble self––acid–doped polyaniline," *J. Am. Chem. Soc.*, 116:7939–7940 (1994).

Chen, S. and Hwang, G., "Water–soluble self–acid–doped conducting polyaniline: structure and properties," *J. Am. Chem. Soc.*, 117:10055–10062 (1995).

Chan, H.S.O., et al., "A new water–soluble, self–doping conducting polyaniline from poly(o–aminobenzylphosphonic acid) and its sodium salts: synthesis and characterization," *J. Am. Chem. Soc.*, 117:8517–8523 (1995).

Dordick, J.S., et al., "Peroxidases depolymerize lignin in organic media but not in water," *Proc. Natl. Acad. Sci. USA*, 83:6255–6257 (1986).

Dordick, J.S., et al., "Polymerization of phenols catalyzed by peroxidase in nonaqueous media," *Biotechnology and Bioengineering*, XXX:31–36 (1987).

(List continued on next page.)

*Primary Examiner*—Duc Truong
*Attorney, Agent, or Firm*—Hamilton, Brook, Smith & Reynolds, P.C.

[57] ABSTRACT

Polymers are formed enzymatically in the presence of an oligomeric or polymeric template. The method includes combining at least one redox monomer or, in some cases, a redox oligomer, with a template and an enzyme, such as horseradish peroxidase, to form a reaction mixture. The redox monomer or oligomer aligns along the template before or during the polymerization, the template thereby affecting at least one physical property of the resulting polymer, such as the molecular weight or shape of the polymer. In one embodiment, the template can be a polyelectrolyte or an optically active polymer.

48 Claims, 7 Drawing Sheets

OTHER PUBLICATIONS

Kazandjian, R.Z., et al., "Enzymatic analyses in organic solvents," *Biotechnology and Bioengineering,* XXVIII:417–421 (1986).

Sakaki, J., et al., "Lipase–catalyzed asymmetric synthesis of 6–(3–chloro–2–hydroxypropyl–1,3–dioxin–4–ones and their conversion to chiral 5,6–epoxyhexanoates," *Tetrahedron: Asymmetry,* 2:343–346 (1991).

Ikeda, R., et al., "Novel synthetic pathway to a poly(phenylene oxide). Laccase–catalyzed oxidative polymerization of syringic acid," *Macromolecules,* 29:3053–3054 (1996).

Akkara, J.A., et al., "Synthesis and characterization of polymers produced by horseradish peroxidase in dioxane," *Journal of Polymer Science: Part A: Polymer Chemistry,* 29:1561–1574 (1991).

Klibanov, A.M. and Morris, E.D., "Horseradish peroxidase for the removal of carcinogenic aromatic amines from water," *Enzyme Microb. Technol.,* 3:119–122 (1981).

Ayyagari, M.S., et al., "Controlled free–radical polymerization of phenol derivatives by enzyme–catalyzed reactions in organic solvents," *Macromolecules,* 28:5192–5197 (1995).

Bruno, F.F., et al., "Enzymatic medicated synthesis of conjugated polymers at the Langmuir trough air–water interface," *Langmuir,* 11:889–892 (1995).

Lapkowski, M., "Electrochemical synthesis of linear polyaniline in aqueous solutions," *Synthetic Metals,* 35:169–182 (1990).

March, J., in *Advanced Organic Chemistry—Reactions, Mechanisms, and Structure* (NY: Magraw–Hill Company), pp.667, 668 (1977).

Shinohara, H., et al., "Enzyme microsensor for glucose with an electro–chemically synthesized enzyme–polyaniline film," *Sensors and Actuators,* 13:79–86 (1988).

Alva, K.S., et al., "Biochemical synthesis of water soluble polyanilines: poly(p–aminobenzoic acid)," *Macromol. Rapid Commun.,* 17:859–863 (1996).

Liao, Y. and Levon, K., "Solubilization of polyaniline in water by interpolymer complexation," *Macromol. Rapid Commun.,* 16: 393–397 (1995).

Excerpts from "Plastics Engineering: Plastics—Saving Planet Earth," vol. LIII, Number 3 (Toronto; March, 1997).

Westerweele, E., et al., "'Inverted'Polymer Light–Emitting Diodes on Cylindrical Metal Substrates," *Advanced Materials,* 7:788–790 (1995).

Ryu, K., et al., "Peroxidase–Catalyzed Polymerization of Phenols: Kinetics of p–Cresol Oxidation in Organic Media," *American Chemical Society Symp. Ser.,* 389:141–157 (1989).

Alva, K. S., et al., "Novel Immobilization Techniques in the Fabrication of Efficient Electrochemical Biosensors," *SPIE,* 2716:152–163 (1996).

leucoemeraldine
(insulating)

emaraldine salt
(conducting)

ENZYMATIC TEMPLATE POLYMERIZATION

RELATED APPLICATION

This is a continuation-in-part of Ser. No. 08/915,827, filed Aug. 21, 1997 now allowed, which is incorporated herein by reference in its entirety.

GOVERNMENT SUPPORT

This invention was made with support from the Government under ARO Cooperative Grant DAAH04-94-2-003. The Government has certain rights in this invention.

BACKGROUND OF THE INVENTION

Recently, there has been an increased interest in tailored development of certain classes of polymers, such as electrically conductive and optically active polymers (e.g. polythiophene, polypyrrole and polyaniline) for application to wider ranges of use. Examples of such uses include light-weight energy storage devices, electrolytic capacitors, anti-static and anti-corrosive coatings for smart windows, and biological sensors. However, the potential applications to which polymers can be put has been limited by some fundamental properties of monomers employed to form these polymers and by limitations of known polymerization techniques.

Among the problems commonly associated with electrically conductive and optically active polymers is their relative lack of water solubility. Typically, therefore, these polymers are formed in an organic solvent. Attempts to increase the water solubility of these polymers, such as polyaniline, have included derivatization of the monomer or resulting polymer formation. However, derivatization of monomers typically slows polymerization, and derivatization of polymers generally causes some degradation.

Moreover, the physical properties of polymeric materials is generally limited by an inability to manipulate the shape and orientation of polymer chains except by mechanical means, such as extrusion, or by polarization of relatively short polymers or oligomers in an electric field. Further, synthetic methods of forming polymers generally do not provide means for manipulating their shape during polymerization.

Therefore, a need exists to overcome or minimize the above-referenced problems associated with polymer synthesis.

SUMMARY OF THE INVENTION

The present invention relates to a method for enzymatic template polymerization.

The method includes combining a redox monomer with a template and an enzyme to form a reaction mixture. The redox monomer aligns along the template to form a complex and polymerizes.

In one embodiment, the method of the invention is an enzymatic polymerization in the presence of a polymeric or oligomeric electrolyte template which can lead to formation of unique structures. For example, the template can cause an ordered polymerization of growing species, simultaneous charge transfer and complexation of the resulting polymer with the template. Further, the template can have a unique conformation and properties that can be imparted to the growing polymer, giving the polymer unique functionalities. In other words, the resulting polymers can have a conformation that would not be produced in the absence of the template. Among the physical properties that can be controlled by the method of the invention are molecular weight, shape, electrical conductivity and optical activity.

In another embodiment, polymerization of a monomer or oligomer in the presence of the template can result in a polymer shell. The template can then be removed by decomposition, dissolution, or some other suitable method, to leave behind a polymer shell. Polymer shells can be predesigned to serve as useful architectures for drug design, drug delivery and molecular imprinting applications, among others.

DETAILED DESCRIPTION OF THE INVENTION

The features and other details of the apparatus and method of the invention will now be more particularly described and pointed out in the claims. It will be understood that the particular embodiments of the invention are shown by way of illustration and not as limitations of the invention. The principal features of this invention can be employed in various embodiments without departing from the scope of the invention. All parts and percentages are by weight unless otherwise specified.

Figure 1:
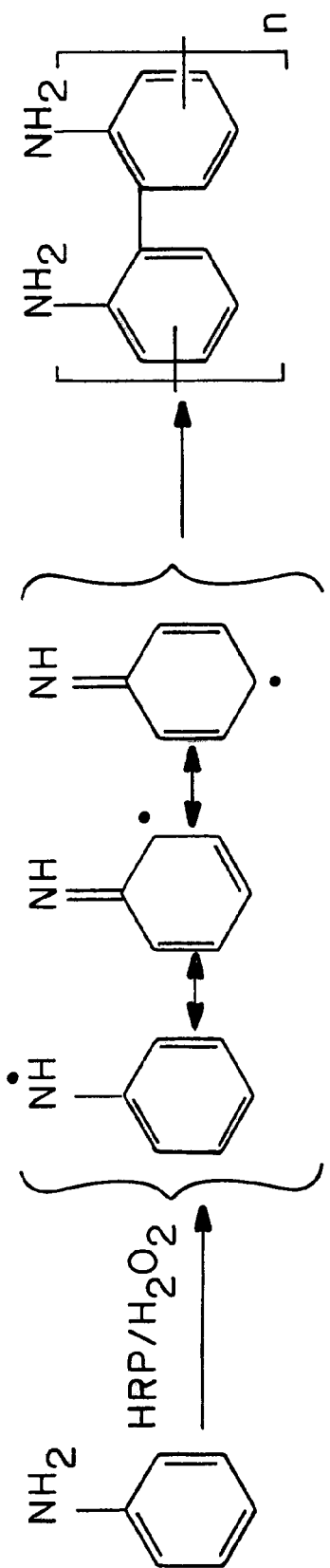
FIG. 1 shows the general mechanism of enzymatic polymerization of aniline in the absence of the polyelectrolyte, promoting ortho- and para-directed reactions.

Enzyme-catalyzed polymerization of aniline and phenol typically involves reaction at the ortho and para positions of the aromatic ring as shown in FIG. 1. This mechanism often results in branched polymeric materials which are intractable and have negligible electrical and optical properties. This invention describes a novel template assisted enzymatic polymerization which results in a new class of polyanilines and polyphenols with electrical and optical stability, water solubility, processability and environmental compatibility.

Figure 2:
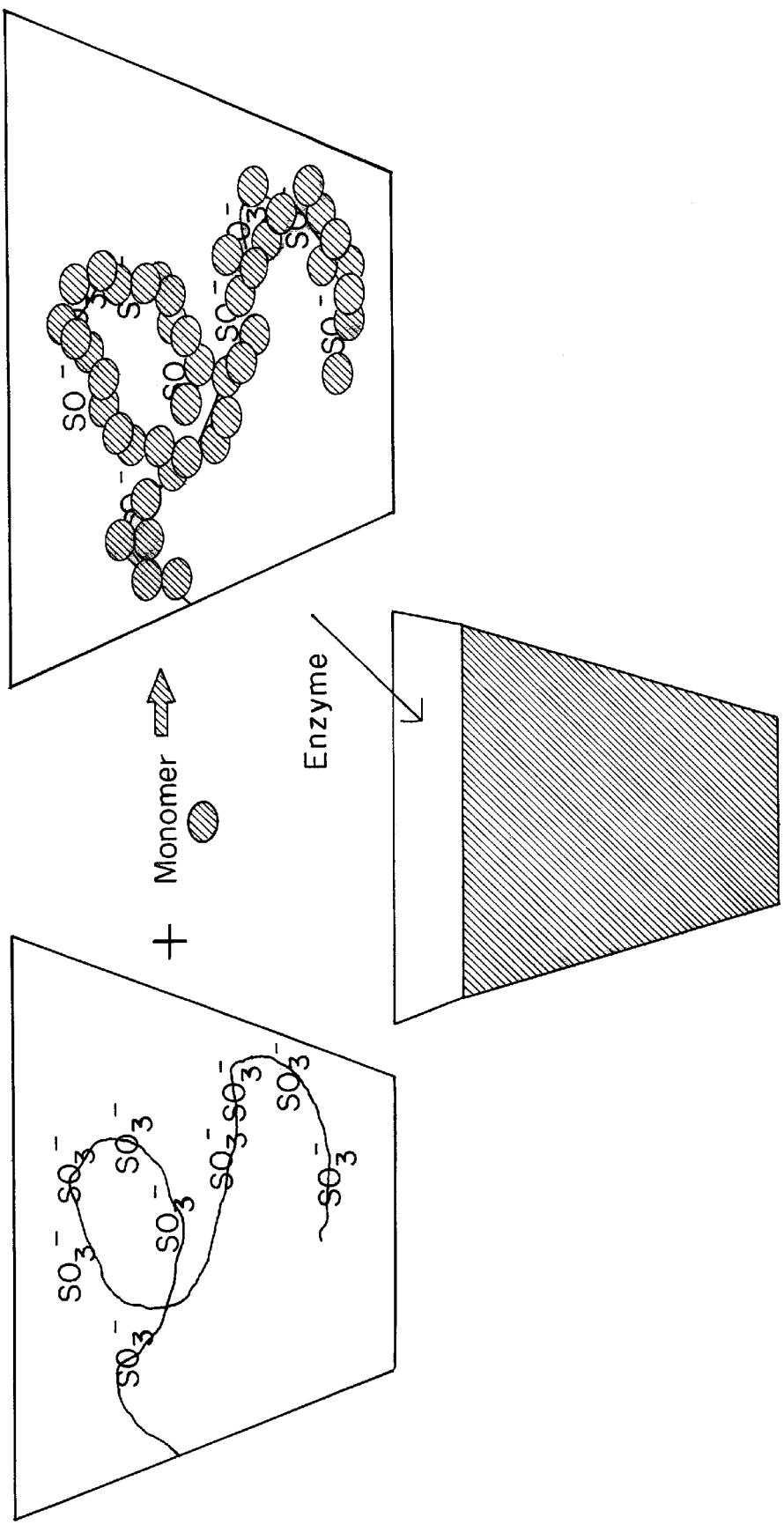
FIG. 2 shows a schematic of the template polymerization where a polyelectrolyte is dissolved in an aqueous solution and the monomer is then added under such conditions that complexation to the polyelectrolyte template occurs; upon addition of the peroxidase and initiator, the reaction takes place resulting in water-soluble polymer complex.

FIG. 2 gives a schematic of this template polymerization where first an aqueous solution containing a polyelectrolyte template and the monomer of interest (aniline and/or phenol) are prepared. Under the proper conditions, the monomer associates with the template and then upon addition of enzyme (peroxidase) and initiator (hydrogen peroxide) the polymerization proceeds resulting in a water-soluble polyaniline or polyphenol template complex.

Figure 3:
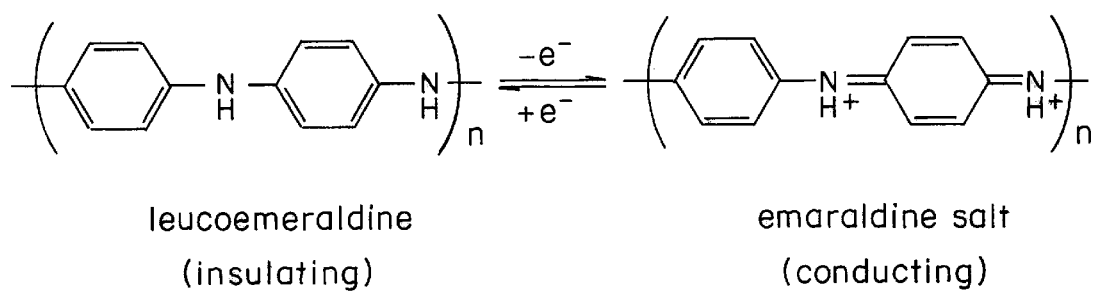
FIG. 3 shows the chemical structure of oxidized (conducting) and reduced (insulating) forms of the polyaniline which is formed under the present conditions.

In this invention, the polyelectrolyte can serve at least three critical functions. First, the polyelectrolyte serves as a template upon which the monomers preferentially align themselves to form a complex, such as a chargetransfer complex, thereby promoting extended conjugation of the resulting polymer chains (limiting parasitic branching). In the case of polyaniline, the mechanism of polymerization is primarily para-directed and results in the electrically active form shown in FIG. 3. This preferential alignment provides improved electrical and optical properties of the final polymer complex. Secondly, the polyelectrolyte can serve as a large molecular dopant species which is complexed and essentially locked to the polyaniline and/or polyphenol chains. Current limitation to the actual use of these polymers in electronic and optical applications has been due to poor dopant stability where the small ionic dopants or chromophores that are currently used are known to diffuse away with time and/or conditions. This locking of a large polyelectrolyte dopant to the polymer is significant in that it ensures that the electronic nature of the polymer's conjugated backbone structure is maintained and hence the desired electronic and optical properties are stabilized. Lastly, the polyelectrolyte template can serve to provide water solubility of the final template-polyaniline complex for environmentally friendly, facile, and inexpensive processing.

The invention includes enzymatic template polymerization. A redox monomer is combined with a template and an enzyme to form a reaction mixture wherein the redox monomer aligns along the template to form a complex and polymerizes. A "template," as that term is employed herein, is defined as a polymer or oligomer that can bind, such as by ionic binding, to the redox monomer being polymerized according to the method of the invention. It is believed that binding of such monomers can affect polymerization of adjacent monomers along the template polymer, thereby controlling the polymerization.

The reaction solution is formed by adjusting the pH of a suitable solvent. Preferably, the solvent is water. However, other components of the solvent can include, for example, dimethyl formamide, methanol, ethanol, dioxane, etc. The pH of the solvent is adjusted to a pH in a range of between about 4.0 and about 10.0. Preferably, the pH is between about 4.0 and about 5.0 for aniline monomer and between about 6.0 and about 7.0 for phenol monomer. Examples of suitable buffers include Tris-HCl buffer, sodium phosphate, etc. Preferably, the buffer is sodium phosphate buffer.

A suitable enzyme is added to the reaction mixture. The concentration of enzyme in the reaction mixture is sufficient to significantly increase the polymerization rate of the monomer in the reaction solution. Typically, the concentration of enzyme in the reaction mixture is in a range of between about one unit/ml and about five units/ml where one unit will form 1.0 mg purpurogallin from pyrogallol in 20 seconds at pH 6.0 at 20° C.

Examples of suitable enzymes include peroxidases, laccase, etc. Preferred enzymes are peroxidases. A particularly preferred enzyme is horseradish peroxidase.

The monomer is added to the reaction mixture. Examples of suitable monomers include certain anilines and phenols, such as aniline, phenol, and derivatives of each, etc. The monomer can be a cation or an anion. Further, the monomer can be, for example, a dye, such as an azo compound, or a ligand. Alternatively, an oligomer can be employed rather than a monomer. Mixtures of different monomers, oligomers, or of monomers and oligomers, can also be employed. In one embodiment, oligomers can form from the monomer prior to association or complexation with a template. The concentration of monomer in the reaction mixture generally is in a range of between about 10 mM and about 100 mM.

A template polymer or oligomer then can be added to the reaction mixture. The template is added to the reaction mixture in a concentration that is sufficient to enable monomers to align along the template polymer during polymerization of the monomer and for the duration of the polymerization reaction. The solution is then suitable for enzyme-catalyzed polymerization. Examples of suitable template polymers include sulfonated polystyrene, sulfonated polystyrene polyion salts, polynucleotides, polypeptides, proteins, biological receptors, zeolites, caged compounds, azopolymers, and vinyl polymers, such as polyvinyl benzoic acid, polystyrene sulfonic acid and polyvinyl polyphosphonates, etc. Examples of suitable template oligomers include deoxyribonucleotides, ribonucleotides, phenol red, azo compounds, etc. The template can be an anion or cation, such as a polyanion or a polycation. Further, the template can be a polyelectrolyte, such as an optically active polyelectrolyte including, for example, azo polymers. The template can also be a dendrimer.

The monomer or oligomer associates with the template to form, for example, a complex. The complex can be electrically or optically active.

The polymerization reaction is a redox reaction and typically is initiated by adding a suitable oxidant, such as a hydrogen peroxide solution, etc. In one embodiment, the hydrogen peroxide has a concentration in the solution in a range of between about one millimolar and about five millimolar. Preferably, the concentration of hydrogen peroxide in the solution added to the reaction mixture is about 30%. The reaction mixture is stirred while slowly adding the hydrogen peroxide solution. Typically, the reaction mixture is maintained at a temperature in a range of between about 10° C. and about 25° C. during polymerization. The resulting polymer can be, for example, a linear polymer, such as an extended linear polymer intertwined with the polyelectrolyte template. Alternatively, the polymer can be dendritic, or branched. In any case, the polymer can have a conformation that would not be produced in the absence of the template.

In one embodiment, the polymer can be polyaniline complexed with a polyelectrolyte template, wherein the polyaniline is an extended linear polymer intertwined with the polyelectrolyte template. In a specific embodiment, the polyaniline is a component of a water soluble electrically conducting complex. Preferably, the temperature of the reaction mixture is maintained at a temperature of about 20° C. during polymerization.

Optionally, the method of the invention includes forming a layer of the polymer on a surface. In this embodiment, the pH of the polymer solution is reduced to a suitable pH, such as a pH in a range of between about 2.0 and about 8.0, by adding a suitable acid, such as hydrochloric acid, etc. A suitable surface, such as a glass slide treated with an alkali, such as CHEMSOLV® alkali, is immersed in a polymer solution for a sufficient period of time to cause the polymer to accumulate at the surface. In one embodiment, a glass slide is immersed in a polymer solution for about ten minutes and then removed. The surface can then be washed with water at a pH of about 2.5 in order to remove unbound polymer from the surface.

Distinct layers of polymers can be applied to a surface by this method. For example, an initial layer can be formed by exposing a suitable surface to a polymer formed by the method of the invention that is a polyanion and then subsequently exposing the same surface, having the polyanion deposited upon it, into a solution of a polycation. In one specific embodiment, a glass slide treated with CHEMSOLV® alkali is exposed to a one milligram/milliliter solution of poly(diallyl dimethyl ammonium chloride) at a pH of 2.5 as a polycation, and then exposed to a one milligram/milliliter solution of SPS/polyaniline formed by the method of the invention, as a polyanion. A bilayer of polymers is thereby formed. Additional layers of these or other polymers can subsequently be applied.

In another embodiment, where the template is an oligomer, polymerization of the template can be initiated simultaneously with, or subsequent to alignment and polymerization of the bound monomer or oligomer. In still another embodiment, the template can be removed from the resulting polymer, such as by decomposition or dissolution, to leave behind a polymer shell.

In one specific embodiment of the method of the invention, the template-assisted enzymatic polymerization of aniline can be carried out in an aqueous solution using 0.1M sodium phosphate or tris-HCl buffer and a pH ranging from about 4.0 to about 10.0. Aniline monomer typically can be added in a range of between about 10 mM and about 100 mM, and an appropriate amount of a template, in this case sulphonated polystyrene (SPS) (molecular weight of 70,000), can be added in ratios ranging from about 1:10 to about 10:1 SPS/aniline. The enzyme horseradish peroxidase then can be added to the reaction mixture in a range of approximately about one unit/ml to about five units/ml. To initiate the reaction, an oxidizer, such as hydrogen peroxide, slowly can be added in 10 $\mu$l increments over a reaction time of 3 hours, with constant stirring to a final concentration ranging from about 10 mM to about 100 mM.

In another specific embodiment of the method of the invention, the template-assisted enzymatic polymerization of phenol can be carried out in an aqueous solution using 0.1M sodium phosphate or tris-HCl buffer and pH ranging from 4.0 to 10.0. Phenol monomer typically can be added in a range of between about 10 mM and about 100 mM and an appropriate amount of the template, sulphonated polystyrene (molecular weight of 70,000), can be added in ratios ranging from about 1:10 to about 10:1 SPS/phenol. The enzyme horseradish peroxidase then can be added to the reaction mixture in a range of approximately one unit/ml to five units/ml. To initiate the reaction, an oxidizer, such as hydrogen peroxide, slowly can be added in 10 $\mu$l increments over a reaction time of about 3 hours with constant stirring to a final concentration ranging from about 10 mM to about 100 mM.

It is to be understood that polymers formed by the method of the invention can be formed in an oxidized, electrically conducting form or in a reduced, insulating form of the polymer. Other physical properties of the polymers that can be affected by the method of the invention include the molecular weight and shape of the polymer. It is also to be understood that the polymers formed by the method of the invention can be modified after polymerization. For example, modification can be made at amine functional groups to form amides or imine groups.

Dissolved polymers formed by the method of the invention can be precipitated from solution by adjusting the pH with a suitable acid or base. Examples of suitable acids or bases include hydrochloric acid, sodium hydroxide, etc.

The invention will now be further and more specifically described by the following examples. All parts and percentages are by weight unless otherwise specified.

EXEMPLIFICATION

EXAMPLE 1

MATERIALS AND METHODS

Horseradish peroxidase (HRP) (enzyme classification number (EC) 1.11.1.7), phosphate and Tris-HCl buffers were obtained from Sigma Chemicals Company, St. Louis, Mo. Aniline, sulfonated polystyrene (SPS) and hydrogen peroxide (30%) were obtained from Aldrich Chemicals, Inc., Milwaukee, Wis. All the chemicals were used as received.

RESULTS AND DISCUSSION

Figure 4:
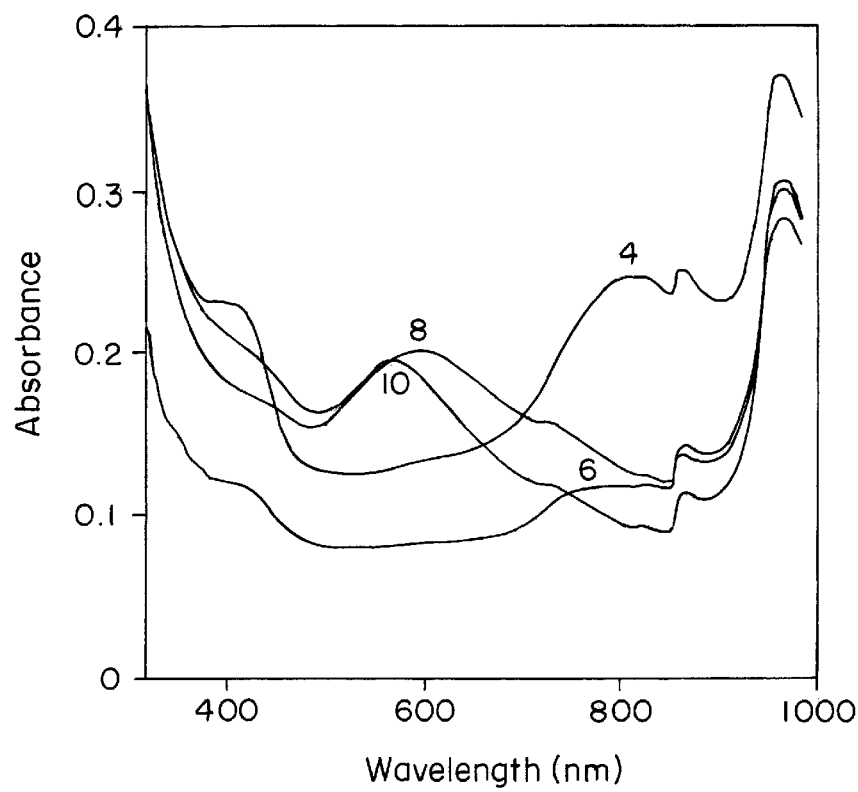
FIG. 4 shows the visible absorption spectra of the polyaniline template complex (0.05M aniline to 0.1M SPS) formed at various pH's.

The progress of a template-assisted polymerization reaction of aniline in the presence of the polyelectrolyte, sulfonated polystyrene (SPS) in a 1:1 ratio, was monitored by the change in visible absorbance. A Perkin-Elmer LAMBDA-9® UV-Vis-near IR spectrophotometer was used for the spectral characterization of the polymer. FIG. 4 shows the visible absorption spectra of the sulfonated polystyrene/polyaniline (SPS/PA) complex prepared under various pH conditions of 4, 6, 8, and 10. As shown in FIG. 4, SPS/PA, prepared at a pH of 4, exhibited a strong absorbance maximum at approximately 780 nm. This was indicative of the emeraldine, or oxidized, electrically conducting form of polyaniline. Polymerization at higher pH resulted in an absorption maximum of about 600 nm, indicating a more insulating form of polyaniline. In all cases, the polymer complex did not precipitate out of solution, indicating that complexation of the polyaniline to the SPS had occurred.

Figure 5:
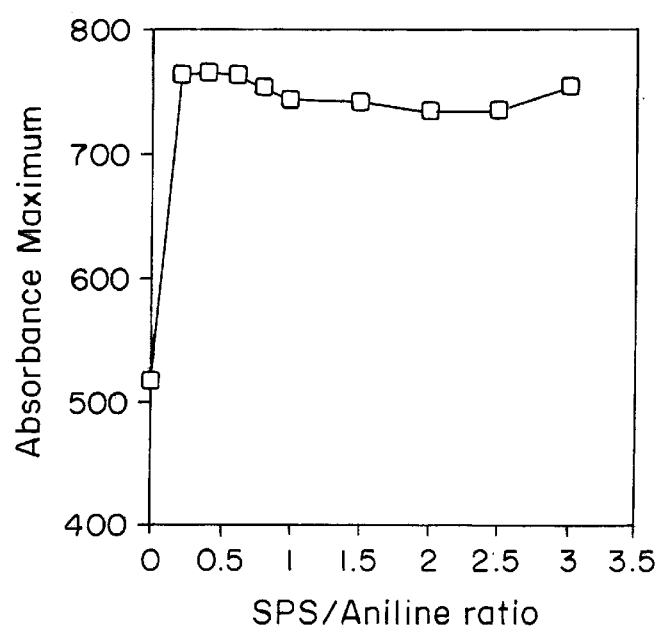
FIG. 5 shows a plot of absorbance versus sulphonated polystyrene (SPS)/aniline ratio to find the optimum dopantto-monomer ratio.

Optimization of the molar ratio of monomer to polyelectrolyte template (repeat unit) was carried out. FIG. 5 shows a plot of absorption maxima for various SPS/aniline ratios. As shown, a ratio of 1:2, SPS/aniline was the minimum ratio required to obtain the electrically conducting form of polyaniline, which had an absorption maximum at approximately 780 nm at a pH in a range of between about 4 and about 5.

Figure 6A:
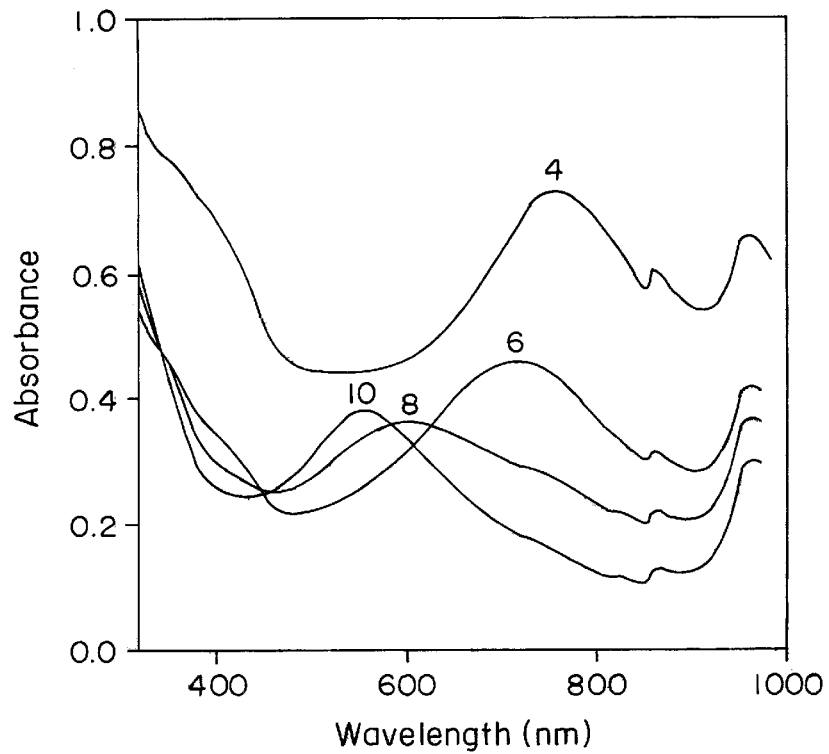
FIG. 6a shows the visible absorption and redox behavior of polyaniline/SPS prepared at pH 4.0 with increasing pH.
Figure 6B:
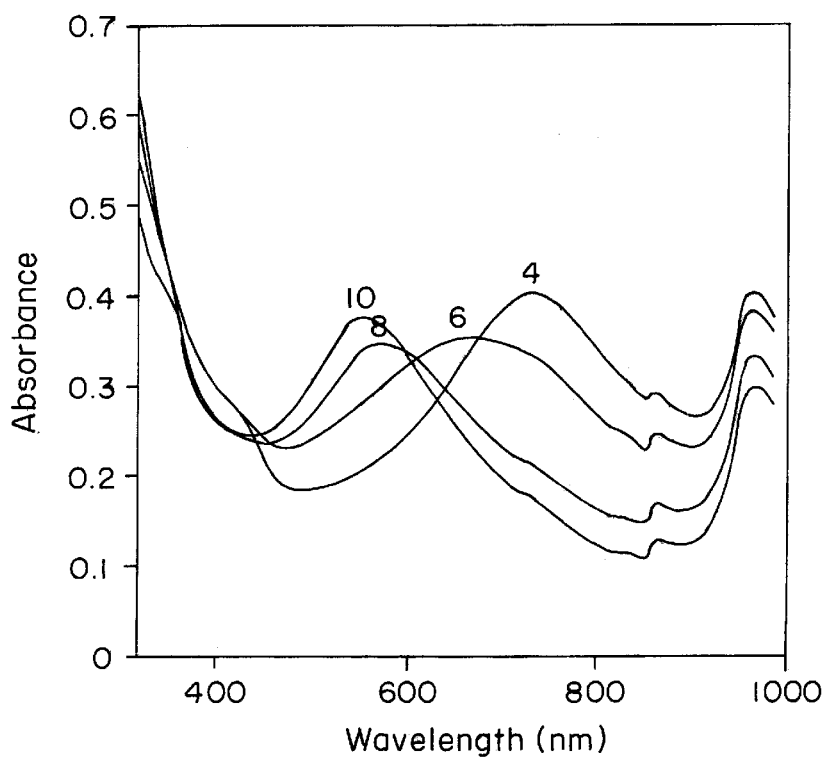
FIG. 6b shows the visible absorbance and redox behavior of polyanilines/SPS (prepared at pH 4.0, then taken to pH 10) with decreasing pH.

The reversible reduction/oxidation (redox) behavior of the SPS/PA complex was monitored by measuring visible absorption of the complex's under various pH conditions. In all cases the polymer complex was prepared at pH 4.0 to obtain the electrically active form of the polyaniline and then the pH of the solution was adjusted for the absorption maxima measurements. As shown in FIG. 6a, the SPS/PA complex shifted in absorption maxima to shorter wavelengths as the pH of the solution was increased. This was indicative of reduction of the polyaniline backbone to a more insulating state. FIG. 6b shows the reverse behavior where the absorption maximum was found to shift back to longer wavelengths with decreasing pH conditions. This was indicative of oxidation of the polyaniline backbone back to a more electrically conductive state. This reversible redox behavior was repeatable and confirms that an electrically active form of polyaniline was present in the final SPS/PA template complex. Molecular weight determination was carried out by column chromatography using Protein PAK 300 SW®-Waters Association columns. Molecular weights of approximately 74,000 Daltons were measured indicating polymerization of the aniline and complexation to the SPS template.

THIN FILMS BY LAYER-BY-LAYER TECHNIQUE

Self-assembly of the SPS/PA complex onto glass slides was carried out by the layer-by-layer electrostatic deposition technique (Ferreira, M., et al., Thin Solid Films, 244:806 (2995) and Decher, G., et al., Thin Solid Films, 210–211 (1992)). A glass slide treated with alkali (CHEMSOLV® alkaline) was exposed to polycation and polyanion solutions repeatedly to transfer monolayers of these polyelectrolytes per every exposure. 1 mg/ml solution of poly(diallyl dimethyl ammonium chloride) (PDAC) at pH 2.5 was used at the polycation while approximately 1 mg/ml solution of SPS/PA at pH 2.5 was used as the polyanion. The glass slide was exposed to each polyelectrolyte solution for 10 minutes and washed with water at the same pH to remove the unbound polymer from the surface. This process was repeated to obtain the desired number of layers.

Figure 7A:
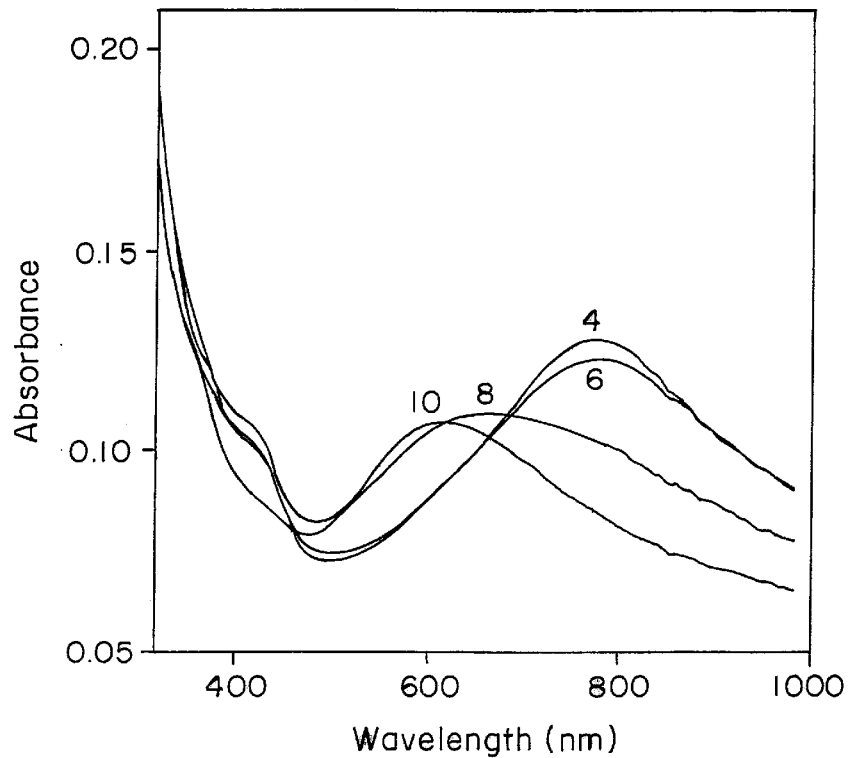
FIG. 7a shows the visible absorbance and redox behavior of a 50 bilayer film of poly(diallyl dimethyl ammonium chloride) (PDAC) alternating with SPS/polyaniline (prepared at pH 4.0, then taken to pH 10) with increasing pH.
Figure 7B:
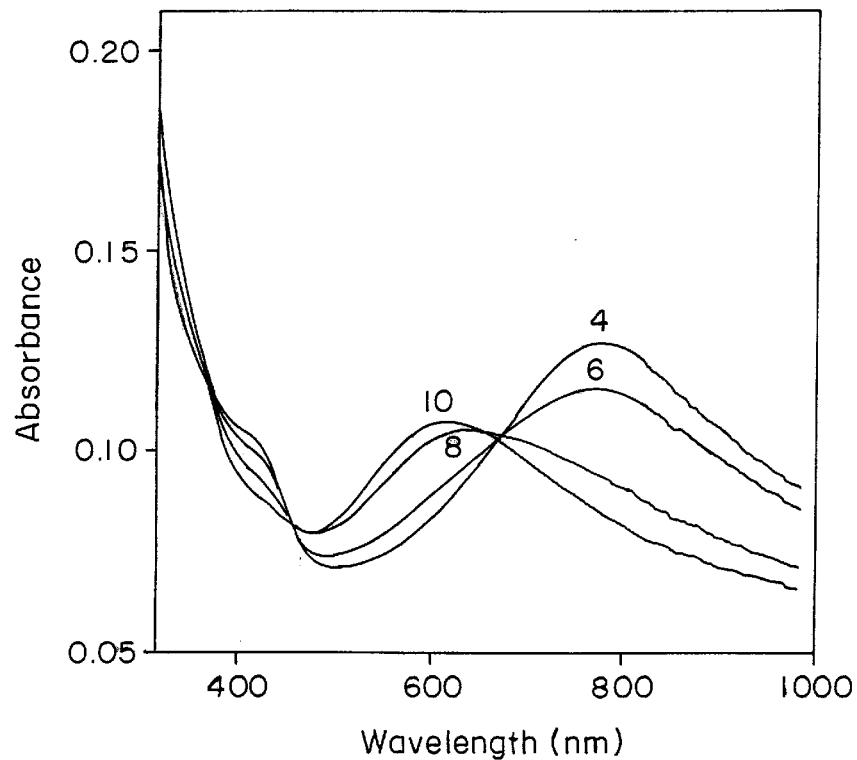
FIG. 7b shows the visible absorbance and redox behavior of a 50 bilayer film of SPS/polyaniline (prepared at pH 4.0) with decreasing pH.

FIGS. 7a and 7b show the visible absorption spectra of a film of fifty bilayers wherein PDAC layers alternate with SPS/PA layers, under various pH conditions. As shown in the figures, the multilayer film exhibited similar redox behavior as was observed previously with the solution absorption spectra. This confirmed that facile electrostatic deposition was feasible with the SPS/PA polymer complex and that the electrical activity was maintained after deposition. In addition, multilayer and bulk films were prepared on indium tin oxide (ITO) slides and four-point probe conductivity measurements were taken. The results gave polymer-complex conductivities in the range of $10^{-3}$ to $10^2$ S/cm.

EXAMPLE 2

MATERIALS AND METHODS

Horseradish peroxidase (HRP) (enzyme classification number (EC) 1.11.1.7), phosphate and Tris-HCl buffers were obtained from Sigma Chemicals Company, St. Louis, Mo. Phenol, sulfonated polystyrene (SPS) and hydrogen peroxide (30%) were obtained from Aldrich Chemicals, Inc., Milwaukee, Wis. All the chemicals were used as received.

RESULTS AND DISCUSSION

Figure 8A:
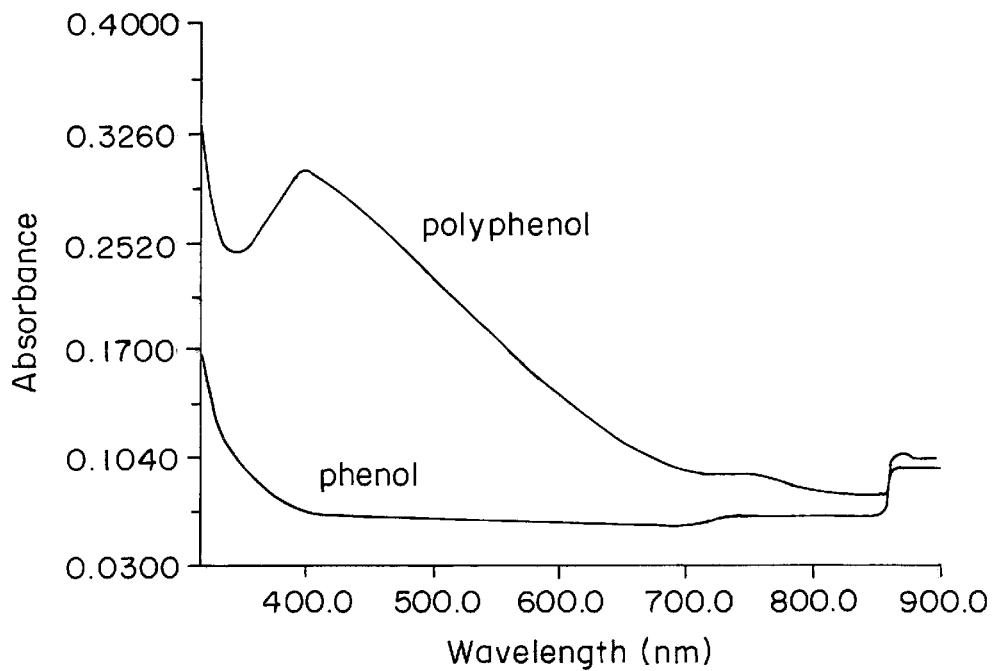
FIG. 8a shows the visible absorbance of polyphenol without SPS versus phenol monomer. Polyphenol precipitated out of solution as a result of polymerization.
Figure 8B:
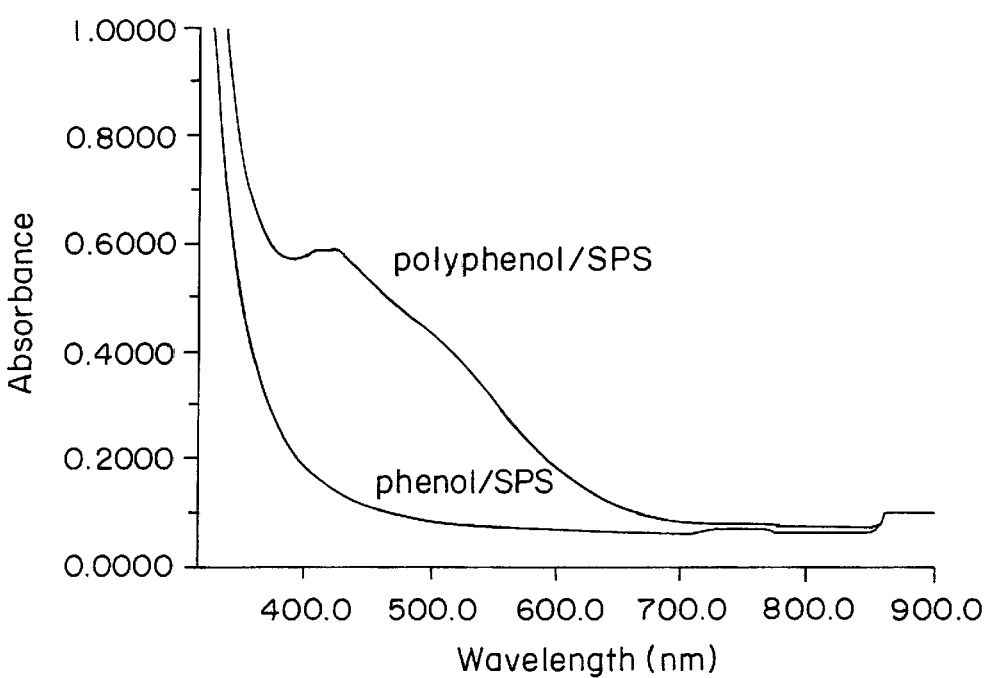
FIG. 8b shows the visible absorbance of polyphenol/SPS template versus phenol monomer, and wherein polyphenol did not precipitate out of solution.

The progress of a template-assisted polymerization reaction of phenol in the presence of the polyelectrolyte, sulfonated polystyrene (SPS) in a 1:1 ratio, was monitored by the change in visible absorbance. Perkin-Elmer LAMBDA-9® UV-Vis-near IR spectrophotometer was used for the spectral characterization of the polymer. FIG. 8a shows the visible absorption of polyphenol without SPS, versus phenol monomer. As shown, there was a significant absorption maximum in the visible spectrum upon polymerization, indicating formation of polyphenol. However, with time the polymer began to precipitate out of solution. FIG. 8b shows the visible absorption of polyphenol with SPS, versus phenol monomer. As shown again, there was a significant absorption maximum of the polymerized system in the visible spectrum. In this case, there was no observed precipitation of the polymer complex out of solution.

Molecular weight determination was carried out by column chromatography using Protein PAK 300 SW® columns manufactured by Waters Association. Molecular weights as large as 136,000 Daltons were measured, indicating polymerization of the phenol and complexation to the SPS template.

EQUIVALENTS

Those skilled in the art will recognize, or be able to ascertain using no more than routine experimentation, many equivalents of the invention described specifically herein. Such equivalents are intended to be encompassed in the scope of the following claims.

We claim:

1. A method for enzymatic template polymerization includes combining a redox monomer with a template and an enzyme to form a reaction mixture, whereby the redox monomer aligns along the template to form a complex and polymerizes.

2. The method of claim 1, wherein the template is an oligomer.

3. The method of claim 1, wherein the template is a polymer.

4. The method of claim 1, wherein the template is a polyelectrolyte.

5. The method of claim 4, wherein the polyelectrolyte is optically active.

6. The method of claim 4, wherein the polyelectrolyte is an azo polymer.

7. The method of claim 1, wherein the template is a substituted polystyrene.

8. The method of claim 7, wherein the template is a sulfonated polystyrene.

9. The method of claim 1, wherein the template is a substituted vinyl polymer.

10. The method of claim 9, wherein the template is a polystyrene sulfonic acid.

11. The method of claim 9, wherein the template is a polyvinyl phosphonate.

12. The method of claim 9, wherein the template is a polyvinyl benzoic acid.

13. The method of claim 1, wherein the template is an azo compound.

14. The method of claim 13, wherein the template is polyphenol red.

15. The method of claim 1, wherein the template is a polycation.

16. The method of claim 1, wherein the template is a polyanion.

17. The method of claim 16, wherein the template is a polynucleotide.

18. The method of claim 17, wherein the template is a deoxyribonucleotide.

19. The method of claim 17, wherein the template is a ribonucleotide.

20. The method of claim 1, wherein the template is a polypeptide.

21. The method of claim 1, wherein the redox monomer is an aniline.

22. The method of claim 1, wherein the redox monomer is a phenol.

23. The method of claim 1, wherein the redox monomer forms a cation.

24. The method of claim 1, wherein the redox monomer forms an anion.

25. The method of claim 1, wherein the redox monomer is a dye.

26. The method of claim 25, wherein the redox monomer is an azo compound.

27. The method of claim 1, wherein the redox monomer is a ligand.

28. The method of claim 1, wherein the enzyme is a peroxidase.

29. The method of claim 28, wherein the peroxidase is horseradish peroxidase.

30. The method of claim 28 further including the step of combining hydrogen peroxide with the reaction mixture.

31. The method of claim 1, wherein the reaction mixture has a pH in a range of greater than about 4.

32. The method of claim 31, wherein the reaction mixture has a pH of between about 6 and about 8.

33. The method of claim 4, wherein the polymer forms a charge-transfer complex with the polyelectrolyte.

34. The method of claim 33, wherein the charge-transfer complex is in an electrically active or optically active form.

35. The method of claim 34, wherein the charge-transfer complex is a conductive polyaniline or polyphenol sulfonated polystyrene polyion salt.

36. The method of claim 1, wherein the complex introduces a conformation on the polymer that is not produced in the absence of the template.

37. The method of claim 36, wherein the conformation of the polymer is an extended linear polymer intertwined with the polyelectrolyte.

38. The method of claim 37, wherein the polymer is polyaniline.

39. The product of claim 17, wherein the polymer has a conformation determined by the polyelectrolyte.

40. The method of claim 1, wherein oligomer chains of said monomer form in solution first and then align with template.

41. The method of claim 40, wherein oligomer chains of said monomer form in solution first and then align with the template and polymerize further.

42. The method of claim 1, wherein the template is a dendrimer.

43. The method of claim 1, wherein the template is a protein.

44. The method of claim 1, wherein the template is a biological receptor.

45. The method of claim 1, wherein the template is a zeolite.

46. The method of claim 1, wherein the template is a caged compound.

47. The method of claim 36, further including the step of removing the template, thereby forming a polymer shell.

48. The product of claim 38, wherein the polyaniline is a component of a water soluble electronically conductive complex.

* * * * *

UNITED STATES PATENT AND TRADEMARK OFFICE
CERTIFICATE OF CORRECTION

PATENT NO. : 6,018,018
DATED : January 25, 2000
INVENTOR(S) : Lynne A. Samuelson, K. Shridhara Alva, Jayant Kumar and Sukant Tripathy It is certified that error appears in the above-identified patent and that said Letters Patent is hereby corrected as shown below:

Assignees on the Patent should read as follows: University of Massachusetts Lowell, Lowell, Massachusetts and Government of the United States, as represented by the Secretary of the Army, Washington, D.C.

Signed and Sealed this

First Day of August, 2000

*Attest:*

Q. TODD DICKINSON

*Attesting Officer*     *Director of Patents and Trademarks*